United States Patent
Delord et al.

(10) Patent No.: US 10,000,166 B2
(45) Date of Patent: Jun. 19, 2018

(54) SCOOP FOR A WATER CONTAINER BUILT INTO THE DIVIDING WALL

(71) Applicant: RENAULT s.a.s., Boulogne Billancourt (FR)

(72) Inventors: Christian Delord, Versailles (FR); Thierry Hlubina, Chaville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days. days.

(21) Appl. No.: 15/312,471

(22) PCT Filed: May 11, 2015

(86) PCT No.: PCT/FR2015/051228
§ 371 (c)(1),
(2) Date: Nov. 18, 2016

(87) PCT Pub. No.: WO2015/177433
PCT Pub. Date: Nov. 26, 2015

(65) Prior Publication Data
US 2017/0203704 A1   Jul. 20, 2017

(30) Foreign Application Priority Data
May 20, 2014   (FR) .................................. 14 54493

(51) Int. Cl.
*B60R 13/07*   (2006.01)
*B62D 25/08*   (2006.01)
(Continued)

(52) U.S. Cl.
CPC ............ *B60R 13/07* (2013.01); *B60H 1/3233* (2013.01); *B60R 13/083* (2013.01); *B62D 25/081* (2013.01)

(58) Field of Classification Search
CPC ...... B60R 13/07; B60R 13/083; B60H 1/3233; B62D 25/081
(Continued)

(56) References Cited

U.S. PATENT DOCUMENTS 8,567,851 B2 * 10/2013 Morden ............... B62D 25/081
   296/192
8,573,682 B2 * 11/2013 Oomen ................... B60J 10/84
   296/192
(Continued)

FOREIGN PATENT DOCUMENTS

EP    1 616 735 A2   1/2006
EP    2 067 691 A2   6/2009
(Continued)

OTHER PUBLICATIONS

International Search Report dated Jun. 19, 2015 in PCT/FR2015/051228 filed May 11, 2015.
(Continued)

*Primary Examiner* — Joseph D. Pape
(74) *Attorney, Agent, or Firm* — Oblon, McClelland, Maier & Neustadt, L.L.P.

(57) ABSTRACT

An arrangement for a motor vehicle including a dividing wall disposed between an engine compartment and a passenger compartment of the vehicle, a water container to collect the water running over the windscreen of the vehicle, and at least one collector to collect an overflow of water contained in the water container. The at least one collector is made up of a component forming an integral part of the dividing wall.

18 Claims, 2 Drawing Sheets

(51) Int. Cl.
*B60R 13/08* (2006.01)
*B60H 1/32* (2006.01)

(58) Field of Classification Search
USPC .......................................................... 296/192
See application file for complete search history.

(56) References Cited

U.S. PATENT DOCUMENTS

| | | | |
|---|---|---|---|
| 8,915,539 B2* | 12/2014 | Matsuoka | B62D 25/081 |
| | | | 296/192 |
| 9,216,770 B2* | 12/2015 | Delord | B62D 25/081 |
| 2009/0146459 A1 | 6/2009 | Watanabe et al. | |
| 2015/0015030 A1 | 1/2015 | Sasaki et al. | |

FOREIGN PATENT DOCUMENTS

| EP | 2 762 388 A1 | 8/2014 |
|---|---|---|
| WO | 2013/105322 A1 | 7/2013 |

OTHER PUBLICATIONS

French Search Report dated Jan. 6, 2015 in FR 1454493 filed May 20, 2014.

* cited by examiner

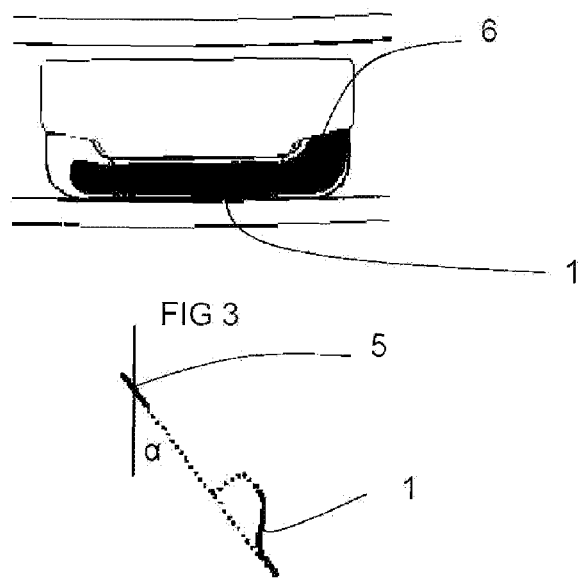
FIG 3
FIG 4
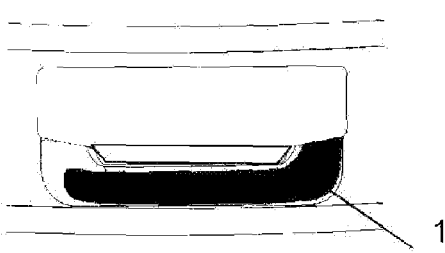
FIG 5
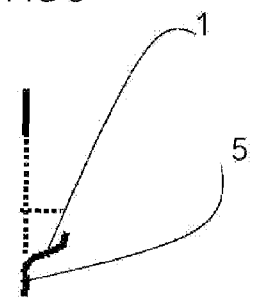
FIG 6

SCOOP FOR A WATER CONTAINER BUILT INTO THE DIVIDING WALL

TECHNICAL FIELD OF THE INVENTION

The invention relates to an arrangement for a motor vehicle comprising a dividing wall intended to be disposed between an engine compartment and a passenger compartment of the vehicle, a water container intended to collect the water running over the windscreen of the vehicle, and at least one collector, particularly a scoop-type collector, collecting an overflow of water contained in the water container.

The object of the invention is also a motor vehicle equipped with an arrangement of this kind.

STATE OF ART

Depending on their architecture, some motor vehicles require the addition of a collector, mostly in the form of a scoop, at the air intake of the air conditioning module. The purpose of this component is to prevent the ingress of water coming from the water container, while allowing the arrival of the air flow towards the air conditioning module without generating a pressure drop therein.

The addition of this scoop is necessary when the low point of the water container is too close vertically to the low point of the air intake. This scoop is generally a plastic part clipped onto the heating partition which separates the passenger compartment from the engine compartment. Some scoops are made of sheet metal, but these are realized by means of an independent part welded by welding to the heating partition.

However, these solutions do not provide total satisfaction on account of the complexity of the arrangement, depending in particular on the number of parts to be manufactured and assembled, with difficulties in terms of assembly, sealing problems and paint treatment also complicating logistics and storage.

OBJECT OF THE INVENTION

The object of the present invention is to propose an arrangement for a motor vehicle which solves the disadvantages listed above.

In particular, one object of the invention is that of providing an arrangement of this kind which is simpler, allows an improvement in financial costs, facilitates assembly, logistics and storage, while ultimately improving the seal and responding to paint treatment problems.

This object may be achieved by means of a motor vehicle arrangement comprising a dividing wall intended to be disposed between an engine compartment and a passenger compartment of the vehicle, a water contained intended to collect the water running over the windscreen of the vehicle, and at least one collector, particularly a scoop-type collector, collecting an overflow of water contained in the water container, said at least one collector being made up of a component forming an integral part of the dividing wall.

The dividing wall is preferably made up of a heating partition or a panel of the motor vehicle.

The arrangement may comprise an air circulation conduit of an air-conditioning/heating device of the motor vehicle and the constituent part of the collector may be disposed at the connection zone between the air circulation conduit and the separation wall, particularly in the lower section thereof.

The circulation conduit may extend from a first side of the dividing wall, particularly intended to be turned towards the passenger compartment, and the constituent part of the collector may project in respect of the dividing wall from a second side of the separation wall opposite said first side and particularly intended to be turned towards the engine compartment.

The constituent part of the collector may project following a displacement in respect of the dividing wall, particularly calculated in a longitudinal direction of the vehicle corresponding to its front/rear travel direction, having a value greater than 20 mm, preferably of between 23 mm and 27 mm.

The constituent part of the collector may preferably be a stamping formed in the material in which the dividing wall is formed.

The constituent part of the collector may exhibit a spatial shape delimiting a cavity in the form of a slot at each of its two lateral ends connecting to the remainder of the dividing wall and each arranged projecting upwards in an opposite direction to the cavity delimited by the collector.

The dividing wall may be inclined to the vertical, at least locally at said at least one collector, at an angle of more than 10 degrees.

A motor vehicle may comprise an arrangement of this kind.

BRIEF DESCRIPTION OF THE DRAWINGS

Other advantages and characteristics will emerge more clearly from the following description of particular embodiments of the invention provided by way of non-limiting examples and represented in the attached drawings in which:

FIGS. 5 and 6 illustrate as a front view and a longitudinal/vertical section, respectively, a detail of another exemplary arrangement according to the invention at the scoop where the dividing wall is vertical.

DESCRIPTION OF PREFERENTIAL EMBODIMENTS OF THE INVENTION

Figure 1:
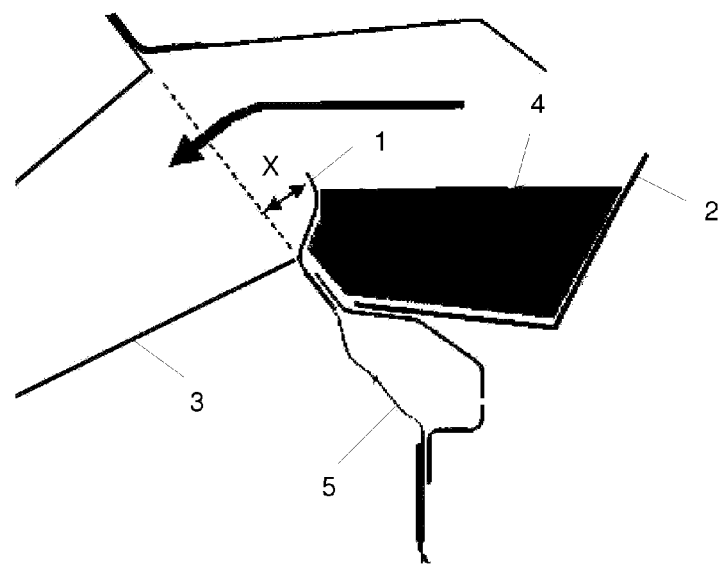
FIG. 1 is a longitudinal-vertical section through an exemplary arrangement according to the invention.
Figure 2:
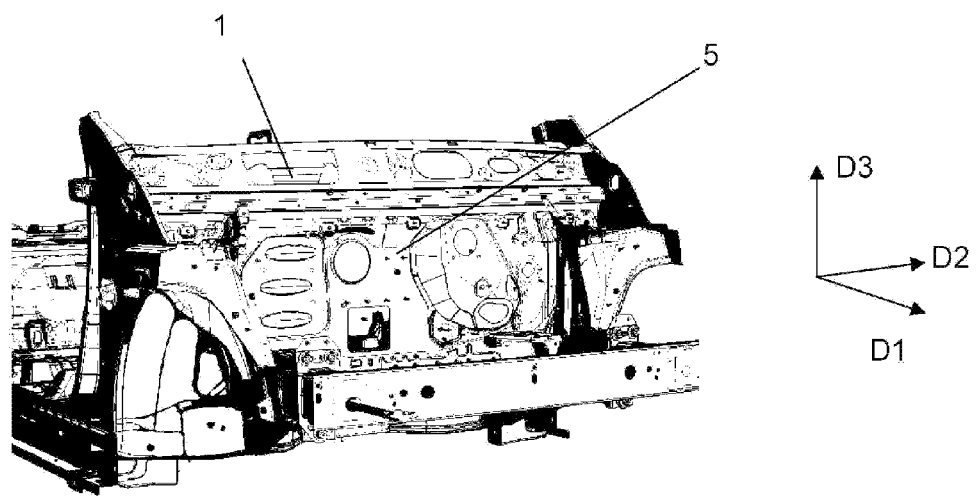
FIG. 2 is a front perspective view of the arrangement in FIG. 1, FIGS. 3 and 4 illustrate as a front view and a longitudinal/vertical section, respectively, a detail of the arrangement in the preceding figures at the scoop.

The arrangement for a motor vehicle forming the object of the invention which will be described below with reference to FIGS. 1 to 6 comprises a dividing wall 5 intended to be disposed between an engine compartment and a passenger compartment of the vehicle, a water container 2 intended to collect the water running over the windscreen of the vehicle, and at least one collector 1, particularly a scoop-type collector, collecting an overflow of water 4 contained in the water container 2.

According to an important characteristic, said at least one collector 1 is made up of a component forming an integral part of the dividing wall 5.

The terms "integral part" in this case preferably mean that the collector 1 is in one piece with the dividing wall 5, particularly formed integrally with the dividing wall 5, so that it preferably constitutes a monolithic assembly in one piece between the dividing wall 5 and the collector 1.

In respect of the prior art, this allows an independent scoop to be eliminated from the heating partition and enables the function to be integrated in an existing part without generating added expense on this part. This also means that an assembly operation for the fixing of the scoop can be dispensed with. This also produces a functional improvement in terms of seal and paint treatment. Finally, the solution presented here allows a reduction in the overall production cost and the investment cost associated with tooling.

The dividing wall 5 is preferably made up of a heating partition, but it may alternatively be made up of a panel of the motor vehicle, particularly depending on cut-outs of chosen parts and the architectural constraints of the dividing wall 5.

The arrangement may also comprise an air circulation conduit 3 of a heating/air-conditioning device of the motor vehicle. In this case, the constituent part of the collector 1 may advantageously be disposed at the connection zone between the air circulation conduit 3 and the dividing wall 5, particularly in its lower section viewed in the vertical direction D3 (FIG. 2) of the vehicle.

In an embodiment such as that illustrated but not limiting in terms of the freedom that can be accorded to the arrangement, the air circulation conduit 3 extends from a first side of the dividing wall 5, particularly intended to be turned towards the passenger compartment in the event that the first side the front side of the wall 5. The constituent part of the collector 1 projects in a longitudinal direction D1 (FIG. 2) of the vehicle in respect of the dividing wall 5 from a second side of the dividing wall 5 opposite the first side and particularly intended to be turned towards the engine compartment in the event that the second side is the rear side of the wall 5. The longitudinal direction D1 of the vehicle corresponds to the front/rear travel direction of the vehicle. It can still be envisaged, however, that the constituent part of the collector 1 projects from the dividing wall 5 on the first side.

According to a non-limiting, advantageous method of obtaining practicable manufacturing possibilities for the wall 5 and the collector 1, the constituent part of the collector 1 is a stamping formed directly in the material in which the dividing wall 5 is formed.

This stamping is then conformed in such a manner as to prevent the ingress of water into the passenger compartment in the event that the water container 2 is filled to the maximum level of the water container 2 with water 4 and to avoid generating excessive pressure drops in the air flow towards the air circulation conduit 3.

To this end, the constituent part of the collector 1 may preferably project following a displacement labeled X in FIG. 1 in respect of the dividing wall 5, particularly calculated in the longitudinal direction of the vehicle D1. This displacement X advantageously has a value greater than 20 mm, preferably of between 23 mm and 27 mm.

In an embodiment such as that illustrated in FIGS. 1 to 4, the constituent part of the collector 1 exhibits a spatial form delimiting a cavity 6 in the form of a slot at each of its two lateral ends (viewed in a lateral direction D2 that can be seen in FIG. 2 of the vehicle corresponding to the right/left direction of the vehicle perpendicular to its longitudinal direction D1) connecting to the remainder of the dividing wall 5. Each cavity 6 is arranged projecting upwards in the vertical direction (D3) in an opposite direction to the cavity delimited on the inside by the collector 1 for its scoop function. This embodiment may advantageously be implemented in the particular case and represented where the dividing wall 5 is inclined to the vertical, at least locally at the collector 1, at an angle α of more than 10 degrees.

These cavities 6 allow the air flow inside the conduit to be maximized, while being compatible with the feasibility constraints of the cut-out, in order to avoid angles that are closed in respect of the forms obtained by stamping.

In an embodiment such as that illustrated in FIGS. 5 and 6, the constituent part of the collector 1 exhibits a spatial form not delimiting the cavities 6: the wall 5 and the collector 1 between them delimit a rectangular-shaped cut-out. This variant may be particularly implemented in the event that the dividing wall 5 is vertical (the angle α being smaller than 5 degrees, for example).

The invention also relates to a motor vehicle comprising an arrangement of this kind.

The invention claimed is:

1. An arrangement for a motor vehicle, comprising:
a dividing wall to be disposed between an engine compartment and a passenger compartment of the vehicle, the dividing wall being a heating partition or a panel of the motor vehicle;
a water container to collect water running over a windscreen of the vehicle; and
at least one scoop-type collector to collect an overflow of water contained in the water container,
wherein said at least one collector is made up of a constituent part forming an integral part of the dividing wall, and
wherein the constituent part of the collector is a stamping formed in a material in which the dividing wall is formed.

2. The arrangement as claimed in claim 1, further comprising an air circulation conduit of an air-conditioning/heating device of the motor vehicle,
wherein the constituent part of the collector is disposed at a connection zone between the air circulation conduit and the separation wall.

3. The arrangement as claimed in claim 2, wherein the constituent part of the collector is disposed in a lower section of the connection zone between the air circulation conduit and the separation wall.

4. The arrangement as claimed in claim 2, wherein the circulation conduit extends from a first side of the dividing wall and the constituent part of the collector projects in respect of the dividing wall from a second side of the dividing wall opposite said first side.

5. The arrangement as claimed in claim 4, wherein the first side of the dividing wall is turned towards the passenger compartment and the second side of the dividing wall is turned towards the engine compartment.

6. The arrangement as claimed in claim 4, wherein the constituent part of the collector projects following a displacement in respect of the dividing wall, the displacement having a value greater than 20 mm.

7. The arrangement as claimed in claim 6, wherein the displacement is calculated in a longitudinal direction of the vehicle corresponding to a front/rear travel direction of the vehicle.

8. The arrangement as claimed in claim 6, wherein the displacement is between 23 mm and 27 mm.

9. The arrangement as claimed in claim 2, wherein the constituent part of the collector exhibits a spatial shape delimiting a cavity in a form of a slot at each of its two lateral ends connecting to a remainder of the dividing wall and each arranged projecting upwards in an opposite direction to the cavity delimited by the collector.

10. The arrangement as claimed in claim 9, wherein the dividing wall is inclined to the vertical, at least locally at said at least one collector, at an angle of more than 10 degrees.

11. A motor vehicle, comprising:
the arrangement as claimed in claim 1.

12. An arrangement for a motor vehicle, comprising:
a dividing wall to be disposed between an engine compartment and a passenger compartment of the vehicle;
a water container to collect water running over a windscreen of the vehicle;
at least one collector to collect an overflow of water contained in the water container; and
an air circulation conduit of an air-conditioning/heating device of the motor vehicle,
wherein said at least one collector is made up of a constituent part forming an integral part of the dividing wall,
wherein the constituent part of the collector is disposed at a connection zone between the air circulation conduit and the separation wall, and
wherein the circulation conduit extends from a first side of the dividing wall and the constituent part of the collector projects in respect of the dividing wall from a second side of the dividing wall opposite said first side.

13. The arrangement as claimed in claim 12, wherein the first side of the dividing wall is turned towards the passenger compartment and the second side of the dividing wall is turned towards the engine compartment.

14. The arrangement as claimed in claim 12, wherein the constituent part of the collector projects following a displacement in respect of the dividing wall, the displacement having a value greater than 20 mm.

15. The arrangement as claimed in claim 14, wherein the displacement is calculated in a longitudinal direction of the vehicle corresponding to a front/rear travel direction of the vehicle.

16. The arrangement as claimed in claim 14, wherein the displacement is between 23 mm and 27 mm.

17. An arrangement for a motor vehicle, comprising:
a dividing wall to be disposed between an engine compartment and a passenger compartment of the vehicle;
a water container to collect water running over a windscreen of the vehicle;
at least one collector to collect an overflow of water contained in the water container; and
an air circulation conduit of an air-conditioning/heating device of the motor vehicle,
wherein said at least one collector is made up of a constituent part forming an integral part of the dividing wall, and
wherein the constituent part of the collector is disposed at a connection zone between the air circulation conduit and the separation wall.

18. The arrangement as claimed in claim 17, wherein the dividing wall is inclined to the vertical, at least locally at said at least one collector, at an angle of more than 10 degrees.

\* \* \* \* \*